US010992887B2

United States Patent
Movshovich

(10) Patent No.: US 10,992,887 B2
(45) Date of Patent: Apr. 27, 2021

(54) SYSTEM AND METHOD FOR EVENT CAMERA DATA PROCESSING

(71) Applicant: Apple Inc., Cupertino, CA (US)

(72) Inventor: Aleksandr M. Movshovich, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/651,215

(22) PCT Filed: Sep. 27, 2018

(86) PCT No.: PCT/US2018/053145
§ 371 (c)(1),
(2) Date: Mar. 26, 2020

(87) PCT Pub. No.: WO2019/067732
PCT Pub. Date: Apr. 4, 2019

(65) Prior Publication Data
US 2020/0260022 A1    Aug. 13, 2020

Related U.S. Application Data

(60) Provisional application No. 62/564,818, filed on Sep. 28, 2017.

(51) Int. Cl.
*H04N 5/347* (2011.01)
*H04N 5/374* (2011.01)
*H04N 5/335* (2011.01)

(52) U.S. Cl.
CPC ............ *H04N 5/347* (2013.01); *H04N 5/335* (2013.01); *H04N 5/374* (2013.01)

(58) Field of Classification Search
CPC ............................................. H04N 5/335–379
See application file for complete search history.

(56) References Cited

U.S. PATENT DOCUMENTS

2016/0078321 A1* 3/2016 Wang ................... G06K 9/6267
382/103
2016/0093273 A1   3/2016 Wang et al.
(Continued)

FOREIGN PATENT DOCUMENTS

WO            97/28641 A1     8/1997

OTHER PUBLICATIONS

International Search Report and Written Opinion, International Application No. PCT/US2018/053145, dated Feb. 28, 2019, pp. 1-16.

(Continued)

*Primary Examiner* — Paul M Berardesca
(74) *Attorney, Agent, or Firm* — Fernando & Partners, LLP

(57) ABSTRACT

In some embodiments, a method is performed at a device with a processor, non-transitory memory, and an event camera including pixel sensors distributed across an area. The method includes converting an event stream from a pixel sensor over a first time period into event frames by dividing the first time period into sub-periods, and binning pixel events of the event stream, where each of the sub-periods is associated with a frame sub-period identifier. The method further includes addressing the pixel sensors by sub-dividing the area into tiles, where each of the tiles includes a grouping of the pixel sensors, and a tile address of a particular pixel sensor is a combination of a tile identifier and a position locator of the particular pixel sensor. The method further includes encoding the pixel events as a function of a tile address, a frame sub-period identifier, and a brightness indicator value.

20 Claims, 7 Drawing Sheets

(56) References Cited

U.S. PATENT DOCUMENTS

2017/0213105 A1* 7/2017 Ji .......................... G06K 9/6202
2017/0278221 A1* 9/2017 Ji ............................. G06K 9/00
2018/0295298 A1* 10/2018 Zamir .................. H04N 5/3745
2020/0005469 A1* 1/2020 Daniilidis .............. H04N 5/232

OTHER PUBLICATIONS

Denis Guangyin Chen et al., "A low-complexity image compression algorithm for Address-Event Representation (AER) PWM image sensors", 2011 IEEE International Symposium of Circuits and Systems (ISCAS), 2011, pp. 2825-2828.

Christoph Posch et al., "A QVGA 143 dB Dynamic Range Frame-Free PWM Image Sensor With Lossless Pixel-Level Video Compression and Time-Domain CDS" IEEE Journal of Solid-State Circuits, vol. 46, No. 1, Jan. 2011, pp. 259-275.

* cited by examiner

SYSTEM AND METHOD FOR EVENT CAMERA DATA PROCESSING

CROSS-REFERENCE TO RELATED APPLICATIONS

This application claims priority to U.S. Provisional Patent App. No. 62/564,818, filed on Sep. 28, 2017, which is hereby incorporated by reference in its entirety.

TECHNICAL FIELD

This relates generally to the field of digital image processing, and more specifically to the encoding of event data captured by an event camera.

BACKGROUND

Intensity frame cameras use clocked image sensors to acquire visual information from a scene. Using all image sensors, intensity frame cameras take images at a preset frame rate regardless of whether the information at a particular pixel has changed since the last image was taken. In various circumstances, this leads to redundancy. The amount of redundancy increases as image sensors advance to higher spatial and temporal resolutions. Consequently, the hardware required for post-processing increases in capacity, complexity, and cost. Further power consumption rises to levels that can be usage-prohibitive in battery-powered mobile devices.

Event cameras perform pre-processing of the visual information directly at the sensor plane. The event camera includes bio-inspired vision sensors that output pixel-level brightness changes instead of standard intensity frames. The output generation is event-controlled and occurs only upon detecting change(s) in a scene. For example, using event camera sensors, recorded relevant information includes changes in lighting intensity received by the individual, autonomously operating pixels. Pixels that do not sense changes in their field of view produce no output. As a result, only information about variable objects is included within the data stream delivered by a pixel event sensor, and there is no information about homogeneous surfaces or motionless backgrounds (e.g., no intensity frame image data in the form of gray-level information).

Event cameras offer significant advantages over intensity frame cameras, namely a high dynamic range and a low latency (e.g., on the order of microseconds). However, in textured scenes with rapid motion, millions of events are generated per second. In order to process such busy scenes, existing event processes can require massive parallel computations.

SUMMARY

Accordingly, described herein are systems and methods of efficient data processing by an event camera. Such systems and methods accumulate events within a time period in order to produce event frames. Different from frames generated by intensity frame cameras, each event frame disclosed herein represents an aggregation of events between two defined timestamps. By aggregating events in frames and associating frame headers with a respective sub-period identifier, the overhead of having timestamps in individual event is reduced. In some embodiments, event frames are partitioned into tiles. Depending on the number of events in each tile, busy tiles, which contain a number of events above a threshold volume, are encoded to further reduce the overhead of addressing each individual pixel. Such systems and methods thus lead to a reduction of event data and enable efficient event camera data processing with low latency.

In accordance with some embodiments, a method is performed at a device with one or more processors, non-transitory memory, and an event camera including a plurality of pixel sensors distributed across a first area. The method includes converting an event stream from a pixel sensor over a first time period into event frames by dividing the first time period into a plurality of sub-periods, and binning pixel events of the event stream based on the plurality of sub-periods and respective timestamps of the pixel events, wherein each of the plurality of sub-periods is associated with a corresponding frame sub-period identifier. The method further includes addressing the plurality of pixel sensors by sub-dividing the first area into tiles, wherein each of the tiles includes a respective grouping of the plurality of pixel sensors, wherein a tile address of a particular pixel sensor is a combination of a respective tile identifier and a position locator of the particular pixel sensor associated with the respective tile identifier. The method additionally includes encoding the pixel events as a function of a respective tile address, a frame sub-period identifier, and a brightness indicator value.

In accordance with some embodiments, a device includes an event camera, an event framer, a tiler, and an encoder. The event camera further includes a plurality of pixel sensors distributed across a first area. The event framer converts a respective event stream, outputted from a respective one of the plurality of pixel sensors during a first time period, into event frames by dividing the first time period into a plurality of sub-periods and binning pixel events in the respective event stream based on the plurality of sub-periods and respective timestamps of the pixel events. The tiler addresses the plurality of pixel sensors by sub-dividing the first area into tiles, wherein each of the tiles includes a grouping of the plurality of pixel sensors, wherein a tile address of a particular pixel sensor is a combination of a respective tile identifier and a position locator of the particular pixel sensor associated with the respective tile identifier. The encoder encodes the pixel events as a function of a respective tile address, a frame sub-period identifier, and a brightness indicator value.

In accordance with some embodiments, a method is performed at a device with one or more processors, non-transitory memory, and an event camera including a plurality pixel sensors distributed across a first area. The method includes converting one or more event streams from corresponding one or more of the plurality of pixel sensors over a first time period into event frames by dividing the first time period into a plurality of sub-periods, and binning pixel events of a respective event stream based on the plurality of sub-periods and respective timestamps of the pixel events, wherein each of the plurality of sub-periods is associated with a corresponding frame sub-period identifier. The method further includes encoding, in accordance with a first encoding process, the pixel events for the first area for the particular sub-period using a first encoding process, in response to a determination that a number of pixel events within the first area breaches a threshold volume within a particular sub-period. The method additionally includes encoding the pixel events for the first area for the particular sub-period using a second encoding process (e.g., individual event encoding for a non-busy or calm tile), in response to a determination that the number of pixel events within the first area does not breach the threshold volume within the particular sub-period.

In accordance with some embodiments, a device includes an event camera, an event framer, and an encoding controller. The event camera further includes a plurality of pixel sensors distributed across a first area. The event framer converts a respective event stream, outputted from a respective one of the plurality of pixel sensors during a first time period, into event frames by dividing the first time period into a plurality of sub-periods and binning pixel events in the respective event stream based on the plurality of sub-periods and respective timestamps of the pixel events. The encoding controller selects an encoder based on whether a number of pixel events within the first area breaches the threshold volume within a particular sub-period and triggers the selected encoder to encode the pixel events for the first area for the particular sub-period.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some implementations, a device includes means for performing or causing performance of the operations of any of the methods described herein.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1:
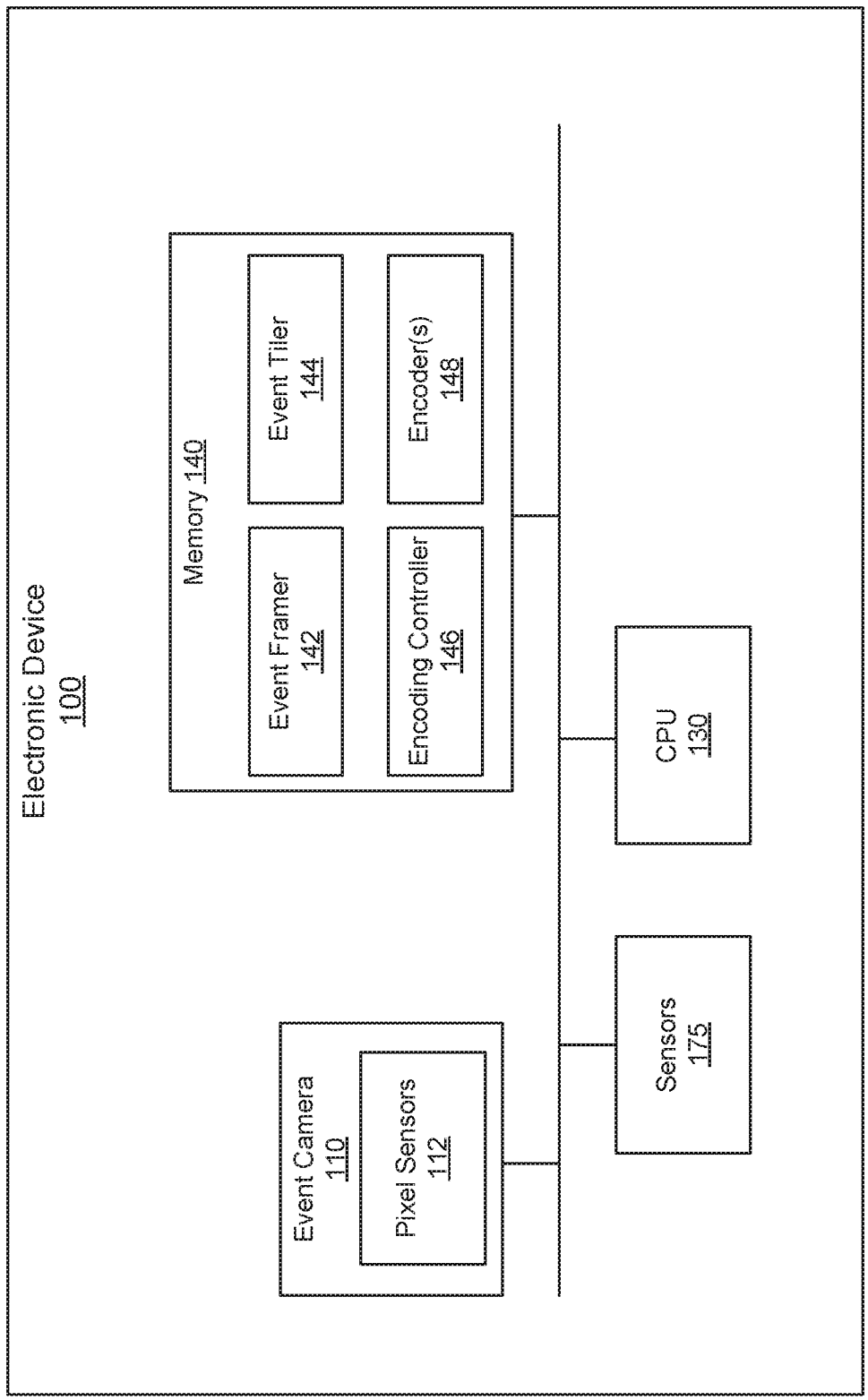
FIG. 1 is a block diagram illustrating a simplified electronic device, in accordance with some embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

It should be appreciated that in the development of any actual implementation (as in any development project), numerous decisions must be made to achieve the developers' specific goals (e.g., compliance with system and business related constraints), and that these goals will vary from one implementation to another. It will also be appreciated that such development efforts might be complex and time consuming, but would nevertheless be a routine undertaking for those of ordinary skill in the art of image capture having the benefit of this disclosure.

Referring to FIG. 1, a simplified block diagram of an electronic device 100 is depicted, in accordance with some embodiments. In some embodiments, the electronic device 100 is part of a multifunctional device, such as a mobile phone, tablet computer, personal digital assistant, portable music/video player, wearable device, or any other electronic device that includes an image processing device. Though not shown in FIG. 1, in some embodiments, the electronic device 100 is connected, via a network, to other network devices, such as other mobile devices, tablet devices, desktop devices, as well as network storage devices, including servers and the like.

In some embodiments, the electronic device 100 includes a central processing unit (CPU) 130 and device sensors 175 (e.g., proximity sensor/ambient light sensor, accelerometer and/or gyroscope etc.). In some embodiments, the processor 130 is a system-on-chip and includes one or more dedicated graphics processing units (GPUs). Further, in some embodiments, the processor 130 includes multiple processors of the same type or different types.

In some embodiments, the electronic device 100 includes one or more cameras, including an event camera 110, which further comprises a plurality of event camera sensors 112 (also referred to as pixel sensors or pixel elements). The pixel sensors 112 are arranged (e.g., as a two-dimensional array) across a first area of the event camera 110 to receive reflections of light. In some embodiments, the first area is an operable area of the event camera 110. In some embodiments, the first area is a sub-portion of the event camera 110.

In some embodiments, each of the pixel sensors 112 is an integrated circuit that generates a photocurrent by a photodiode in response to impinging light intensity. In such an integrated circuit, the light-sensitive photodiode can be integrated with a capacitor that accumulates charge. When the accumulated charge crosses certain threshold, the electrical voltage is read out from the capacitor and the voltage of the electrical response is indicative of the brightness of reflected light. In some embodiments, a brightness indicator value includes one of a number of discrete threshold level values. For example, in some embodiments, the number of discrete threshold level values include a positive level value and a negative level value indicating that the respective pixel is brighter or darker, respectively. In some embodiments, the number of discrete threshold level values include a plurality of level values that each corresponds to a voltage magnitude range.

Figure 2:
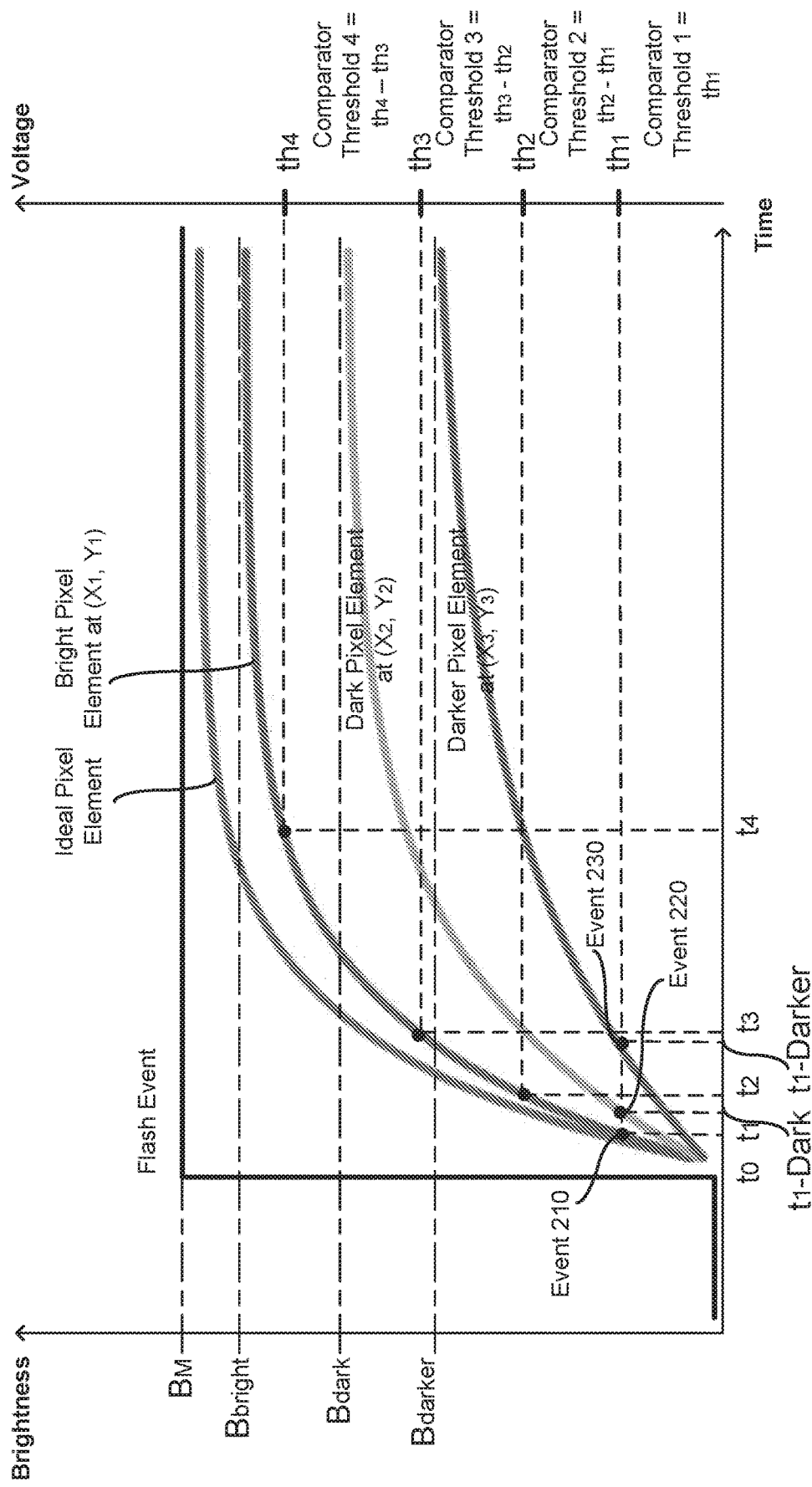
FIG. 2 illustrates exemplary event curves, in accordance with some embodiments.

For example, in FIG. 2, in response to a flash event as a step function, charge is accumulated in event sensor circuits. Events 210, 220, and 230, as indicated by dots in FIG. 2, are generated when the capacity voltages breach comparator threshold 1. Event 210 is generated by a pixel element at location $(X_1, Y_1)$ corresponding to a bright pixel (hereinafter "bright pixel element"); event 220 is generated by a pixel element at location $(X_2, Y_2)$ corresponding to a dark pixel (hereinafter "dark pixel element"); and event 230 is generated by a pixel element at location $(X_3, Y_3)$ corresponding to a darker pixel (hereinafter "darker pixel element"). At the time of the breach, e.g., $t_1$, $t_1$-Dark, and $t_1$-Darker, the electrical threshold value is $th_1$, which is indicative of the brightness of reflected light detected at the respective location.

In FIG. 2, the event curves represent electrical levels output by the pixel elements as a function of time in response to light, e.g., the ideal event curve represents electrical levels outputted by the ideal pixel element versus time, the bright pixel element curve represents electrical levels outputted by the bright pixel element versus time, etc. When the ideal event curve reaches a steady state in response to the step function flash event, the steady state voltage is approximately the same as the flash event voltage, indicating that the ideal pixel element detects the maximum amount of reflected light $B_M$ from the flash event. For the bright pixel element, $B_{bright}$ is lower than $B_M$, indicating a less-than-ideal brightness of reflected light being detected at location $(X_1, Y_1)$. Likewise, $B_{darker}$ at location $(X_3, Y_3)$<$B_{dark}$ at location $(X_2, Y_2)$<$B_{bright}$ at location $(X_1, Y_1)$ indicates that the brightness at location $(X_3, Y_3)$ is less than location $(X_2, Y_2)$ and is further less than location $(X_1, Y_1)$.

Referring back to FIG. 1, in some embodiments, the electronic device 100 includes memory 140. The memory 140 includes one or more types of memory used for performing device functions in conjunction with the processor 130. In some embodiments, the memory 140 includes cache, ROM, and/or RAM. In some embodiments, the memory 140 stores various programming modules during execution as well as serves as a buffer for storing one or more images generated based on events outputted by the event camera 110. In some embodiments, the various programming modules include an event framer 142, an event tiler 144, an encoding controller 146, and/or one or more encoders 148.

In some embodiments, the event framer 142 receives one or more event streams output from the pixel sensors 112 during a first time period. The event framer 142 converts each event stream into event frames by dividing the first time period into a plurality of sub-periods and binning pixel events in the respective event stream based on the plurality of sub-periods and respective timestamps of the pixel events. The binning of events and the framing of events are further explained below in connection with FIGS. 3 and 4.

In some embodiments, the event tiler 144 addresses the plurality of pixel sensors 112 by sub-dividing the first area into tiles and assigning tile addresses of pixel sensors 112. The division of the first area is performed by including a grouping of the plurality of pixel sensors 112. In some embodiments, a tile address of a particular pixel sensor 112 is a combination of a respective tile identifier and a position locator of the particular pixel sensor 112 associated with the respective tile identifier. The tile addressing is further described below in connection with FIGS. 5 and 6.

In some embodiments, the encoding controller 146 selects an encoder from the encoder(s) 148 based on whether a number of pixel events within the first area breaches the threshold volume within a particular sub-period, and triggers the selected encoder 148 to encode the pixel events for the first area for the particular sub-period. The encoder selection and the encoding process are further described below in connection with FIGS. 5 and 6.

Figure 3:
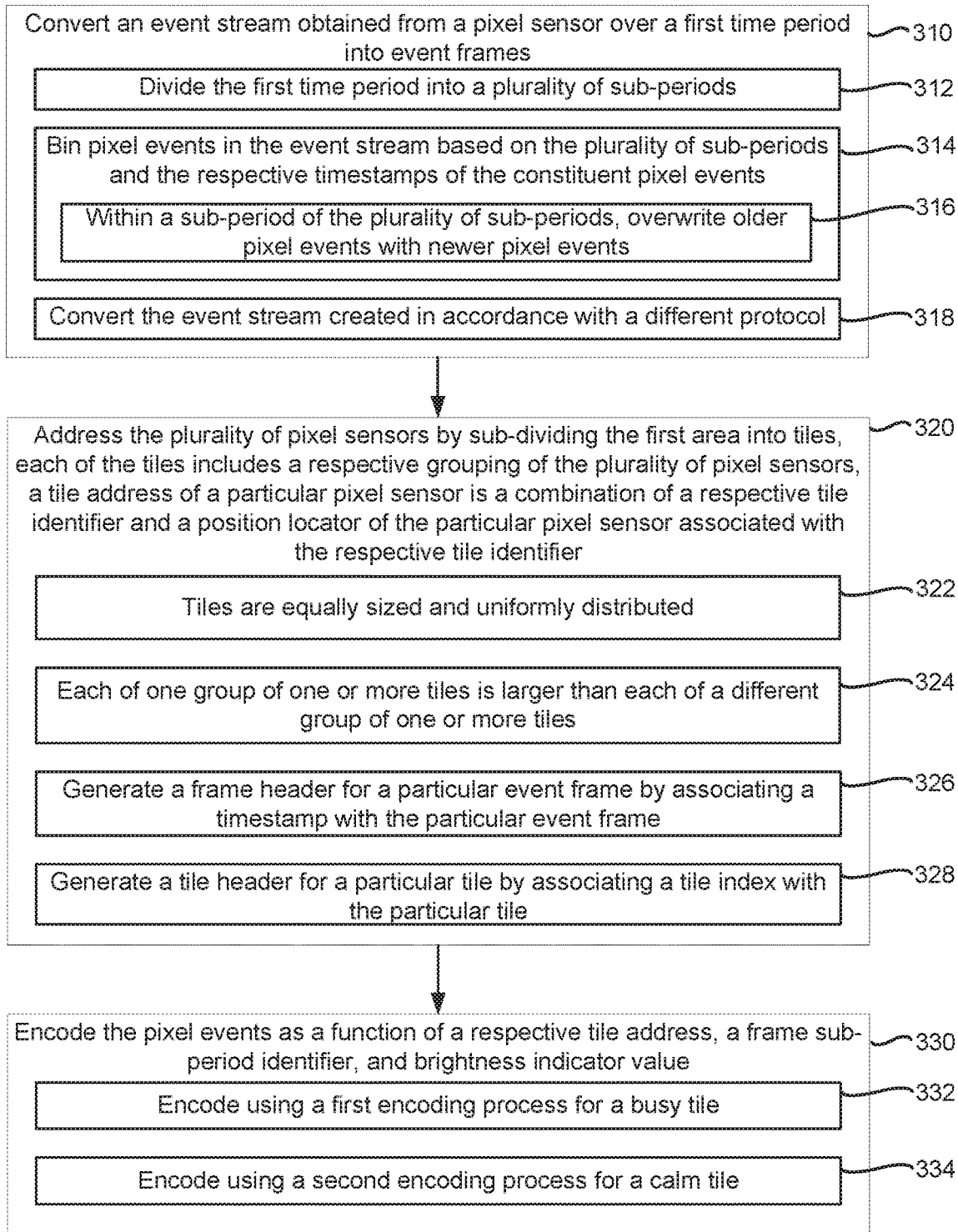
FIG. 3 is a flow diagram illustrating a method of event framing, in accordance with some embodiments.

FIG. 3 is a flow diagram illustrating a method 300 of event framing, in accordance with some embodiments. In some embodiments, the method 300 is performed at an image processing device (e.g., the electronic device 100, FIG. 1) with a processor (e.g., the processor 130, FIG. 1) and non-transitory memory (e.g., the memory 140, FIG. 1). In some embodiments, the image processing device further includes an event camera (e.g., the event camera 110, FIG. 1), which has a plurality of pixel sensors (e.g., the event camera sensors 112, FIG. 1) distributed across a first area arranged to receive reflections of light during a first time period and output events when changes in brightness are detected. In some embodiments, the first area is an operable area of the event camera. In some embodiments, the first area is a sub-portion of the operable area, e.g., obtaining events from event sensors distributed across a sub-portion of the operable area of the event camera. In some embodiments, the image processing device includes an event framer (e.g., the event framer 142, FIG. 1) to convert event streams to event frames by dividing the first time period into sub-periods, an event tiler (e.g., the event tiler 144, FIG. 1) to address event tiles, and an encoder (e.g., the encoder 148) to encode pixel events as a function of a respective tile address, a frame sub-period identifier, and a brightness indicator value.

In some embodiments, the method 300 is performed by processing logic, including hardware, firmware, software, or a combination thereof. In some embodiments, the method 300 is performed by a processor executing code stored in a non-transitory computer-readable medium (e.g., a memory).

The method 300 begins, at block 310, with the device (e.g., the event framer 142, FIG. 1) converting an event stream from a pixel sensor during a first time period into event frames. The device performs the conversion, at block 312, by dividing the first time period into a plurality of sub-periods, and, at block 314, by binning pixel events of the event stream based on the plurality of sub-periods and respective timestamps of the pixel events, where each of the plurality of sub-periods is associated with a corresponding frame sub-period identifier. In some embodiments, at block 316, within a sub-period of the plurality of sub-periods, the device overwrites older pixel events with newer pixel events.

Figure 4:
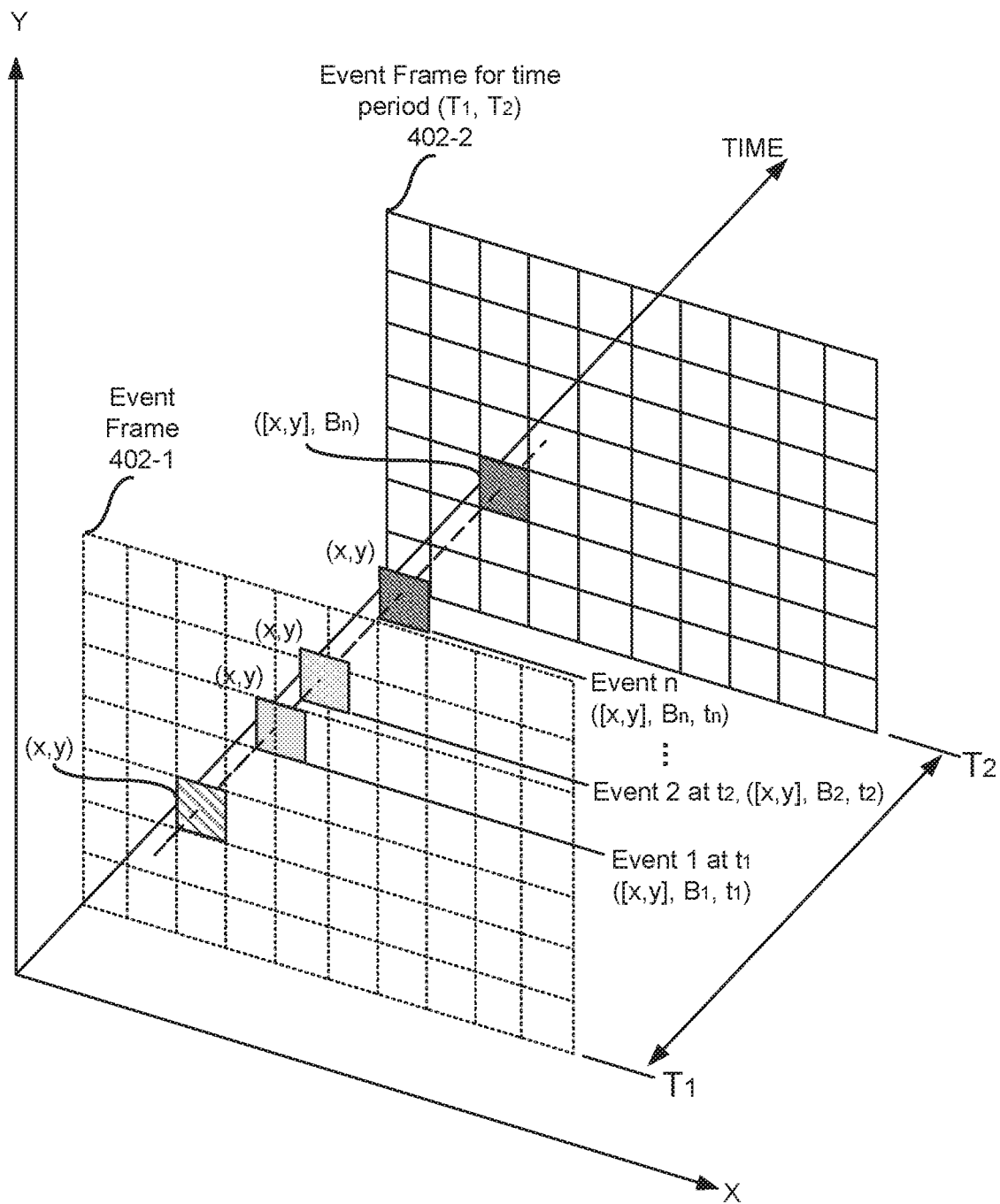
FIG. 4 shows exemplary event frames, in accordance with some embodiments.

For example, FIG. 4 shows exemplary event frames 402 generated by the event framer 142, in accordance with some embodiments. An event stream output from a pixel sensor at location (x, y) includes a plurality of pixel events during a time period, e.g., 0 to $T_2$. The event framer 142 divides the time period to a plurality of sub-periods and associates a frame sub-period identifier with a corresponding sub-period, e.g., associating a timestamp corresponding to the sub-period ($T_1$, $T_2$) with event frame 402-2 and using the timestamp as the frame sub-period identifier for event frame 402-2. In some embodiments, the sub-periods are equal in duration. In such embodiments, regular spaced timestamps define a sequence of event frames.

For the sub-period ($T_1$, $T_2$), a number of events are binned, e.g., event 1 at time $t_1$, with brightness indicator $B_1$, event 2 at time $t_2$ with brightness indicator $B_2$, ... event n at time $t_n$ with brightness indicator $B_n$. Events, as explained above in connection with FIG. 2, can be expressed as an indication of brightness (or an indication of the change in brightness) at the location corresponding to the pixel sensor (e.g., x-coordinate and y-coordinate in a two-dimensional pixel array) at a particular point in time, e.g., the events 1 ... n in FIG. 4 can be represented by the following data: ([x, y], $B_1$, $t_1$), ([x, y], $B_2$, $t_2$) ... ([x, y], $B_n$, $t_n$).

In some embodiments, the events are binned such that older events within the sub-period are overwritten by newer events, e.g., event 1 is overwritten by event 2, and events 1 and 2 are overwritten by event n, etc. As a result, at the end of the sub-period ($T_1$, $T_2$), event frame 402-2 is generated that includes the event data from event n at $t_n$ for location (x, y), e.g., ([x, y], Be). In other words, event frame 402-2 in accordance with some embodiments includes a timestamp representing the sub-period associated with the event frame, followed by event data in the format of ([x, y], B) for each pixel. Thus, by introducing a frame header for a sub-period and not having a timestamp in each pixel event within a frame, the number of bits per frame is reduced.

Referring back to FIG. 3, at block 318, in some embodiments, the conversion includes converting the event stream created in accordance with a first protocol to a second protocol, which is different from the first protocol. For example, event sensors manufactured by different vendors can output event streams in accordance with different protocols, e.g., the events are represented by different data formats. Prior to the conversion to event frames, events are extracted from such event streams. The extracted events are then used for event frame generation, in accordance with some embodiments.

At block 320, the device (e.g., the tiler 144, FIG. 1) addresses the plurality of pixel sensors by sub-dividing the first area into tiles, such that each of the tiles includes a respective grouping of the plurality of pixel sensors, a tile address of a particular pixel sensor is a combination of a respective tile identifier, and a position locator of the particular pixel sensor is associated with the respective tile identifier. In some embodiments, the position locator of the particular pixel sensor includes two-dimensional coordinates of the particular pixel sensor (e.g., x-coordinate and y-coordinate of the pixel sensor as shown in FIG. 4). The divided tiles, in some embodiments, at block 322, are equally sized and uniformly distributed across the first area. In some other embodiments, at block 324, each of a first group of one or more of the tiles has an area larger than each of a second group of one or more tiles. For example, in FIG. 6, the event tile 620-a around the edge belongs to a first group, and the event tile 620-m in the center belongs to a second group. Event tile 620-m is smaller than the event tile 620-a, so that more granularities are presented in the data for smaller tiles. Such embodiments are useful when, for example, activities close to the center of the event camera are considered more important, e.g., an eye camera aims to track iris activities.

At block 326, in some embodiments, the addressing includes generating a frame header for a particular event frame by associating a respective frame sub-period identifier with the particular event frame. For example, in FIG. 4, the event framer 142 can associate a timestamp corresponding to the sub-period (T1, T2) with event frame 402-2 and use the timestamp as the frame sub-period identifier for event frame 402-2. At block 328, in some embodiments, the addressing includes generating a tile header for a particular tile by associating a respective tile identifier with the particular tile. For example, in FIG. 6, the tiler 144 generates a tile header that includes a tile index "a" for the event tile 620-a. Using the tile index, event tiles 620 can be located within the event frame.

At block 330, the device encodes pixel events as a function of a respective tile address, a frame sub-period identifier, and a brightness indicator value. In some embodiments, at block 332, for a busy tile (e.g., the number of pixel events within the tile breaches a threshold volume within a sub-period), the device encodes the pixel events using a first encoding process. In some embodiments, at block 334, for a calm tile (e.g., the number of pixel events within the tile does not breach a threshold volume within a sub-period), the device encodes the pixel events using a second encoding process that is different from the first encoding process. The first encoding process and the second encoding process are further described below in detail with reference to FIG. 5.

In some embodiments, the steps 310-334 described above are performed for processing events of one event stream. In some embodiments, these steps 310-334 are performed for events in each event stream, e.g., obtaining a respective event stream from each of the plurality of pixel sensors during the first time period and binning pixel events for each event stream as described above, followed by the addressing process and the encoding process described above.

Figure 5:
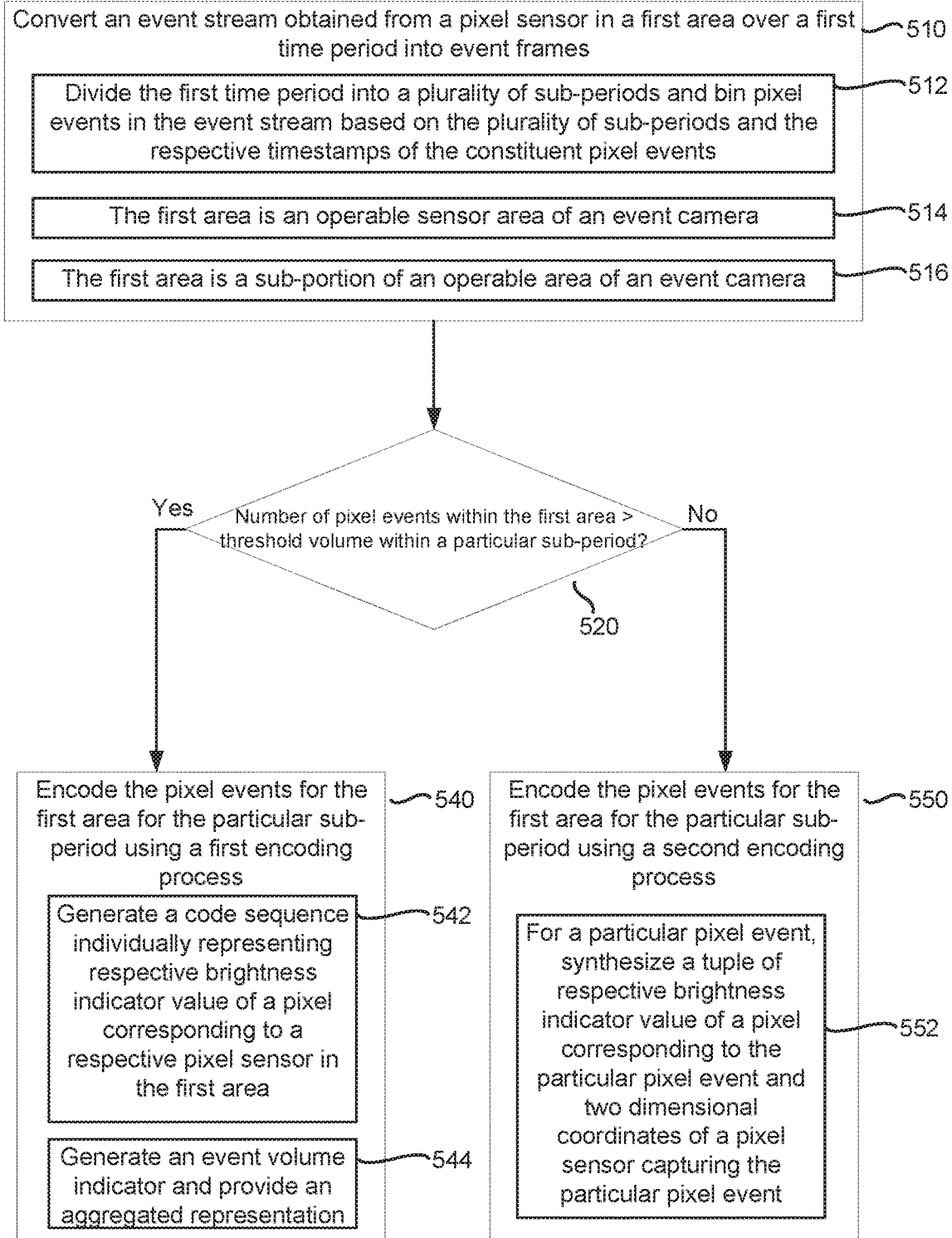
FIG. 5 is a flow diagram illustrating a method of event encoding, in accordance with some embodiments.
Figure 6:
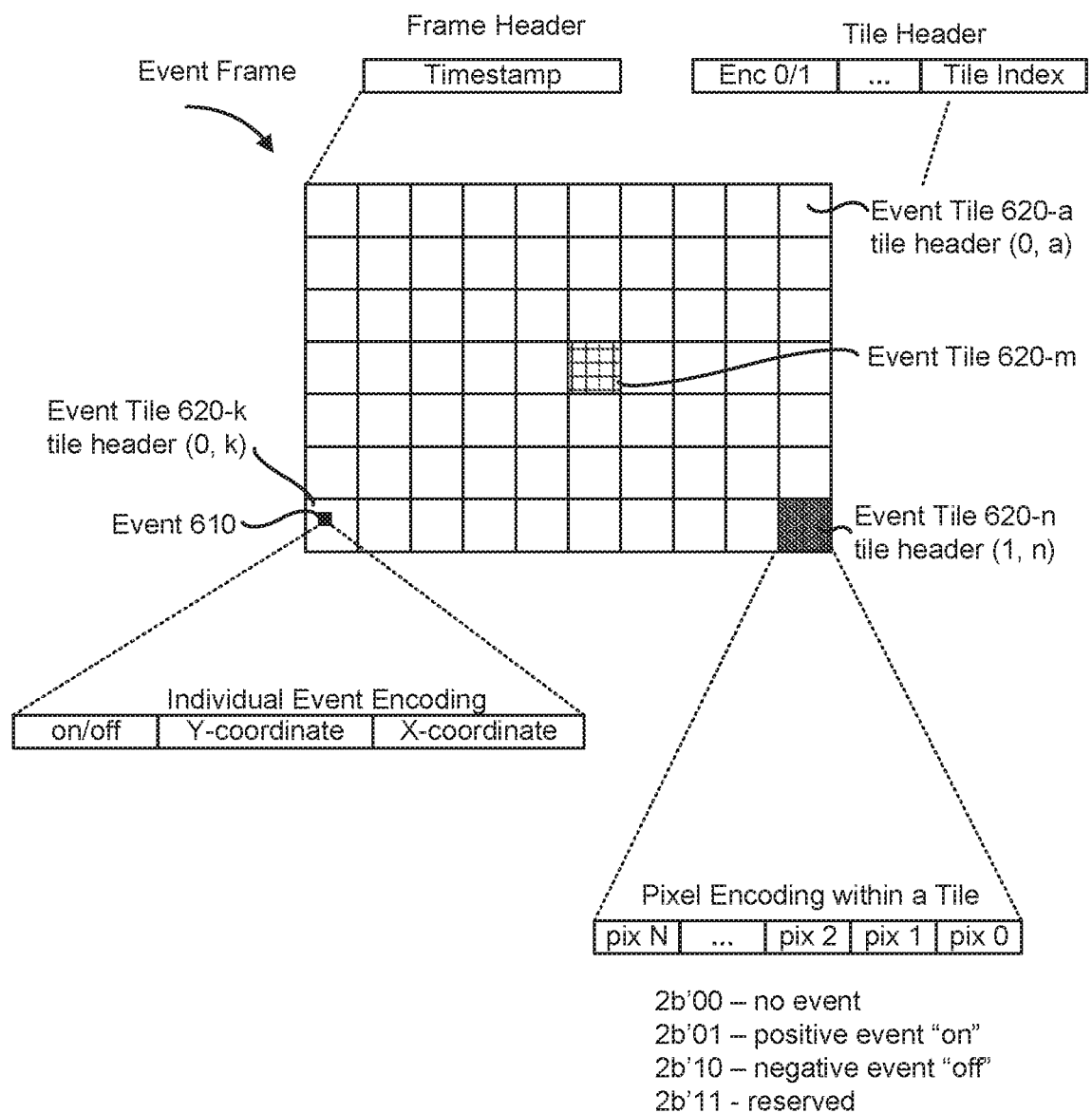
FIG. 6 shows exemplary data structures for event encoding, in accordance with some embodiments.

Turning to FIG. 5, FIG. 5 is a flow diagram illustrating a method 500 of event encoding, in accordance with some embodiments. In some embodiments, the method 500 is performed at an image processing device (e.g., the electronic device 100, FIG. 1) with a processor (e.g., the processor 130, FIG. 1) and non-transitory memory (e.g., the memory 140, FIG. 1). In some embodiments, the image processing device further includes an event camera (e.g., the event camera 110, FIG. 1), which has a plurality of pixel sensors (e.g., the event camera sensors 112, FIG. 1) distributed across a first area arranged to receive reflections of light during a first time period and output events when changes in brightness are detected. In some embodiments, the image processing device includes an event framer (e.g., the event framer 142, FIG. 1) to convert event streams to event frames by dividing the first time period into sub-periods, and an encoding controller (e.g., the encoding controller 146, FIG. 1) to select an encoder (e.g., the encoder 148) and to trigger the selected encoder to encode the pixel events for the first area for a particular sub-period. In some embodiments, the image processing device further includes an event tiler to divide the first area into tiles and address the tiles.

In some embodiments, the method 500 is performed by processing logic, including hardware, firmware, software, or a combination thereof. In some embodiments, the method 500 is performed by a processor executing code stored in a non-transitory computer-readable medium (e.g., a memory).

The method 500 begins, at block 510, with the device (e.g., the event framer 142, FIG. 1) converting an event stream from a pixel sensor during a first time period into event frames. At block 512, as explained above in connection with FIG. 3, in some embodiments, the device performs the conversion by dividing the first time period into a plurality of sub-periods and by binning pixel events of the event stream based on the plurality of sub-periods and respective timestamps of the pixel events, where each of the plurality of sub-periods is associated with a corresponding frame sub-period identifier.

At block 514, in some embodiments, the first area is an operable area of an event camera. In such embodiments, the event framer (e.g., the event framer 142, FIG. 1) addresses the plurality of pixel sensors in the first area together as an event frame. Event encoding is performed for the event frame by addressing the events in the event frame, including generating a frame header. For example, in FIG. 4, the event framer 142 associates a timestamp corresponding to the sub-period ($T_1$, $T_2$) with event frame 402-2 and uses the timestamp as the frame sub-period identifier for event frame 402-2. By introducing a frame header for a sub-period and not having a timestamp in each pixel event within a frame, the number of bits per frame is reduced.

At block 516, in some embodiments, the first area is a sub-portion of an operable area of an event camera. In such embodiments, the tiler addresses the plurality of pixel sensors in the first area as a tile. For example, in FIG. 6, the event tiler 144 assigns addresses to pixel sensors in a sub-portion of an operable area of an event camera, namely, a tile. The tiler 144 generates a tile header that includes a tile identifier (e.g., a tile index within an event frame). Within each tile, in some embodiments, the tile address of a particular pixel sensor within the tile is a combination of a respective tile identifier (e.g., the tile index) and a position locator of the particular pixel sensor. For example, in FIG. 6, event tile 620-$k$ is associated with a tile header that has a tile index k. The tile address of a particular pixel sensor producing the event 610 is a combination of the tile index k and a position locator of the particular pixel sensor, e.g., x-coordinate and y-coordinate of the particular pixel sensor. As such, the location of an event can be identified through the combination of the tile index and the two-dimensional coordinates of the pixel sensor.

At block 520, in some embodiments, the device (e.g., the encoding controller 146, FIG. 1) determines whether the number of pixel events within the first area breaches a threshold volume within a particular sub-period and selects an encoder (e.g., the encoder 148) accordingly. In some embodiments, the threshold volume is a function of the number of pixel events across the area associated with a tile. For example, the tiler sub-divides the first area into a number of tiles, and each tile includes a grouping of N pixel sensors. A tile can be considered a busy tile when the number of pixel events across the tile breaches N/8, for example. On the other hand, a tile can be considered a non-busy or calm tile when the number of pixel events across the tile is fewer than N/8, for example.

At block 540, in response to a determination that a number of pixel events within the first area breaches a threshold volume within a particular sub-period, the selected encoder encodes the pixel events for the first area for the particular sub-period in accordance with a first encoding process. On the other hand, at block 550, in response to a determination that a number of pixel events within the first area does not breach a threshold volume within a particular sub-period, the selected encoder encodes the pixel events for the first area for the particular sub-period in accordance with a second encoding process. In other words, the device encodes the calm tiles in accordance with one encoding process and the device encodes the busy tiles in accordance with another encoding process to further reduce the number of bits representing each busy tile.

For a busy tile, in some embodiments, at block 542, the first encoding process includes generating a code sequence individually representing a respective brightness indicator value of a pixel corresponding to a respective pixel sensor in the first area. In such embodiments, each pixel can be represented by 2 bits in the code sequence, in accordance with some embodiments. For example, in FIG. 6, a code sequence is generated for event tile 620-$n$. 2 bits are used for the encoding of each pixel, e.g.:

2b'00—no event
2b'01—positive event, e.g., the pixel is brighter
2b'10—negative event, e.g., the pixel is darker
2b'11—reserved A code sequence is generated by arranging pixels in order, e.g., 2-bit code for pixel 0, 2-bit code for pixel 1, 2-bit code for pixel 2 . . . 2-bit code for pixel N.

In some embodiments, at block 544, the first encoding process includes generating an event volume indicator that indicates that a number of pixel events within the first area breaches the threshold volume within the particular sub-period, and providing an aggregated representation of the number of pixel events within the first area within the particular sub-period. For example, in FIG. 6, the tile header includes an encoding field, e.g., 0 means the tile is a calm tile and the tile includes individual event encoding described below in connection with block 552; 1 means the tile is a busy tile and the tile includes pixel encoding as described above for block 542. The encoding field is an event volume indicator, such that when it is on, it indicates the number of pixel events within the tile has exceeded the threshold volume. The tile as a whole can have an aggregated representation, e.g., a sequence of 2-bit codes.

In some embodiments, at block 552, the second encoding process, for a particular pixel event, includes synthesizing a tuple including: a respective brightness indicator value of a pixel corresponding to the particular pixel event; and two dimensional coordinates of a pixel sensor capturing the particular pixel event. For example, in FIG. 6, the tile 620-$k$ has event volume indicator valued 0 in the tile header, indicating the tile is a calm tile. The device thus encodes the tile 620-*k* by synthesizing a tuple, e.g., (on/off, Y, X).

The method 500 described herein reduces the number of bits required for dense area by generating a code sequence and by providing an aggregated representation of the busy area. On the other hand, when the events are sparse in the first area, individual event encoding is performed for efficiency. As such, systems and methods in accordance with embodiments described herein reduces overhead and improves the efficiency of event camera data processing.

Figure 7:
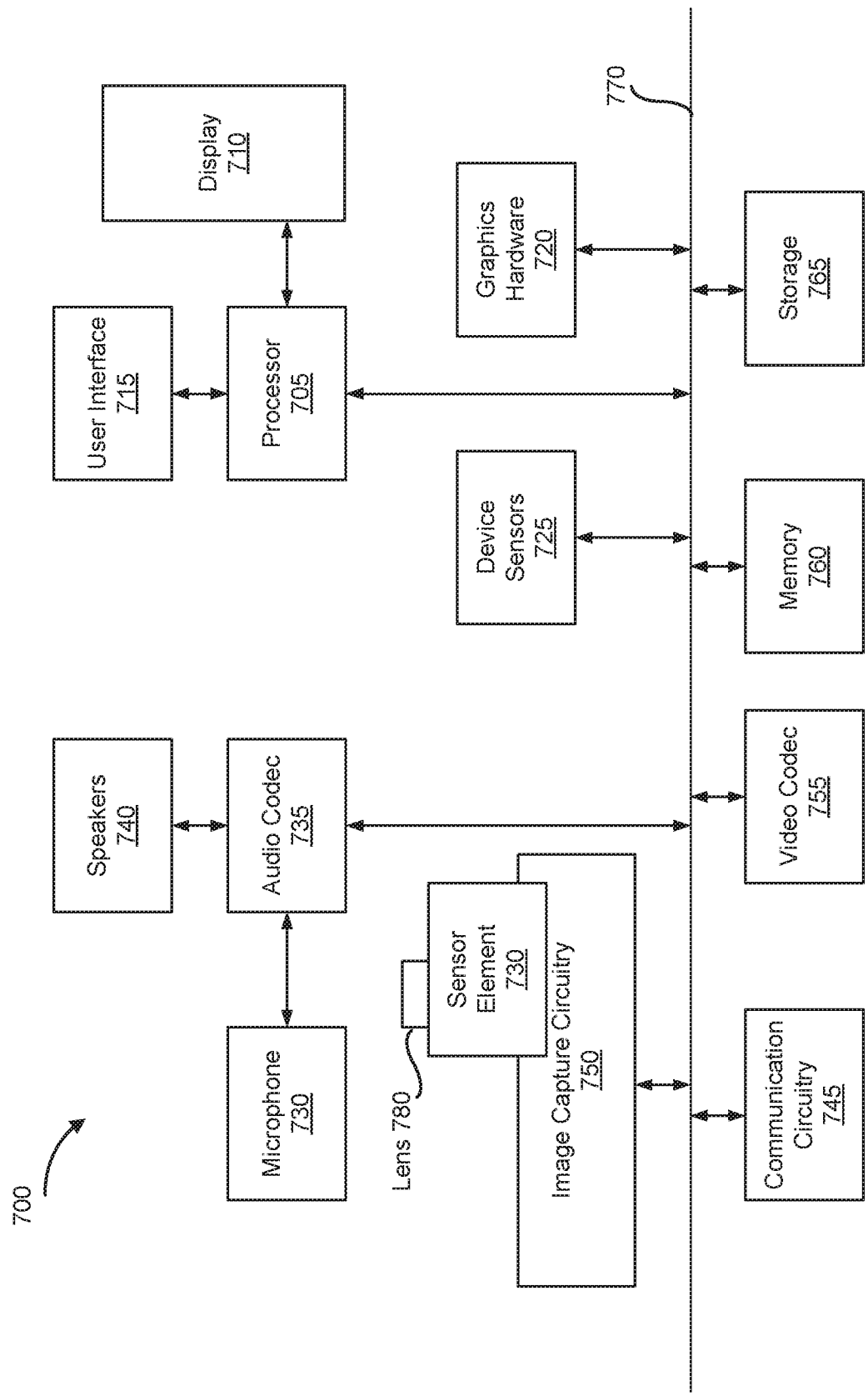
FIG. 7 is a block diagram illustrating a simplified multifunctional device, in accordance with some embodiments.

Referring now to FIG. 7, a simplified functional block diagram of illustrative a multifunction device 700 is shown in accordance with some embodiments. In some embodiments, multifunction electronic device 700 includes processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, digital image capture circuitry 750 (e.g., including camera system 100), video codec(s) 755 (e.g., in support of digital image capture unit 750), memory 760, storage device 765, and communications bus 770. In some embodiments, the multifunction electronic device 700 is a digital camera or a personal electronic device, such as a personal digital assistant (PDA), personal music player, mobile telephone, or a tablet computer.

In some embodiments, the processor 705 executes instructions necessary to carry out or control the operation of many functions performed by the device 700 (e.g., the generation and/or processing of images as disclosed herein). The processor 705, for instance, drives the display 710 and receives user input from the user interface 715. The user interface 715, in some embodiments, allows a user to interact with the device 700. For example, the user interface 715 can take a variety of forms, such as a button, keypad, dial, a click wheel, keyboard, display screen and/or a touch screen. The processor 705 can also, for example, be a system-on-chip such as those found in mobile devices and include a dedicated graphics processing unit (GPU). In some embodiments, the processor 705 is based on reduced instruction-set computer (RISC) or complex instruction-set computer (CISC) architectures or any other suitable architecture and may include one or more processing cores. The graphics hardware 720 in some embodiments is a special purpose computational hardware for processing graphics and/or assisting the processor 705 to process graphics information. In some embodiment, the graphics hardware 720 includes a programmable GPU.

In some embodiments, through lens 754, the image capture circuitry 750 uses sensors (or pixel sensors, or sensor elements, or pixel elements) 752 to capture images and/or events. Output from the image capture circuitry 750 is processed, at least in part, by the video codec(s) 765 and/or the processor 705 and/or the graphics hardware 720, and/or a dedicated image processing unit or pipeline incorporated within the circuitry 765. Images so captured are stored in the memory 760 and/or storage 755.

In some embodiments, the images captured by sensors 752 and the camera circuitry 750 are processed in accordance with the methods disclosed herein, at least in part, by video codec(s) 755 and/or processor 705 and/or graphics hardware 720, and/or a dedicated image processing unit incorporated within the circuitry 750. Images so captured and/or processed are stored in memory 760 and/or storage 765. The memory 760 includes one or more different types of media used by the processor 705 and graphics hardware 720 to perform device functions. For example, the memory 760 can include memory cache, read-only memory (ROM), and/or random access memory (RAM). The storage 765 can store media (e.g., audio, image and video files), computer program instructions or software, preference information, device profile information, and any other suitable data. In some embodiments, the storage 765 includes one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). In some embodiments, the memory 760 and storage 765 are used to tangibly retain computer program instructions or code organized into one or more modules and written in any desired computer programming language. When executed by, for example, the processor 705, such computer program code is implement one or more of the methods described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at a device with one or more processors, non-transitory memory, and an event camera including a plurality of pixel sensors distributed across a first area:
converting an event stream from a pixel sensor over a first time period into event frames by dividing the first time period into a plurality of sub-periods, and binning pixel events of the event stream based on the plurality of sub-periods and respective timestamps of the pixel events, wherein each of the plurality of sub-periods is associated with a corresponding frame sub-period identifier;
addressing the plurality of pixel sensors by sub-dividing the first area into tiles, wherein each of the tiles includes a respective grouping of the plurality of pixel sensors, wherein a tile address of a particular pixel sensor is a combination of a respective tile identifier and a position locator of the particular pixel sensor associated with the respective tile identifier; and
encoding the pixel events as a function of a respective tile address, a frame sub-period identifier, and a brightness indicator value.

2. The method of claim 1, wherein the brightness indicator value includes one of a number of discrete threshold level values.

3. The method of claim 1, wherein binning the pixel events includes, within a particular one of the plurality of sub-periods, overwriting older pixel events with newer pixel events.

4. The method of claim 1, wherein the tiles are equally sized and uniformly distributed across the first area.

5. The method of claim 1, wherein each of a first group of one or more of the tiles has an area larger than each of a second group of one or more tiles.

6. The method of claim 1, wherein the position locator of the particular pixel sensor includes two-dimensional coordinates of the particular pixel sensor.

7. The method of claim 1, wherein addressing the plurality of pixel sensors includes generating a frame header for a particular event frame by associating a respective frame sub-period identifier with the particular event frame.

8. The method of claim 1, wherein addressing the plurality of pixel sensors includes generating a tile header for a particular tile by associating a respective tile identifier with the particular tile.

9. The method of claim 1, further comprising:
obtaining a respective event stream from each of the plurality of pixel sensors over the first time period; and
binning pixel events for each event stream.

10. The method of claim 1, wherein converting the event stream includes converting the event stream created in accordance with a first protocol to a second protocol, different from the first protocol.

11. The method of claim 1, wherein encoding the pixel events as the function of the respective tile address, the frame sub-period identifier, and the brightness indicator value includes:
determining that a number of pixel events within a respective tile associated with the respective tile address breaches a threshold volume within a sub-period associated with the sub-period identifier; and
encoding, in accordance with a first encoding process, the pixel events in the respective tile in response to determining breach of the threshold volume.

12. The method of claim 1, wherein encoding the pixel events as the function of the respective tile address, the frame sub-period identifier, and the brightness indicator value includes:
determining that a number of pixel events within a respective tile associated with the respective tile address does not breach a threshold volume within a sub-period associated with the sub-period identifier; and
encoding, in accordance with a second encoding process, the pixel events in the respective tile in response to determining no breach of the threshold volume.

13. A device comprising:
an event camera including a plurality of pixel sensors distributed across a first area;
an event framer to convert a respective event stream, outputted from a respective one of the plurality of pixel sensors during a first time period, into event frames by dividing the first time period into a plurality of sub-periods and binning pixel events in the respective event stream based on the plurality of sub-periods and respective timestamps of the pixel events;
a tiler to address the plurality of pixel sensors by sub-dividing the first area into tiles, wherein each of the tiles includes a grouping of the plurality of pixel sensors, wherein a tile address of a particular pixel sensor is a combination of a respective tile identifier and a position locator of the particular pixel sensor associated with the respective tile identifier; and
an encoder to encode the pixel events as a function of a respective tile address, a frame sub-period identifier, and a brightness indicator value.

14. The device of claim 13, wherein the event framer overwrites older pixel events with newer pixel events.

15. The device of claim 13, wherein each of a first group of one or more of the tiles has an area larger than each of a second group of one or more tiles.

16. The device of claim 13, wherein the tiler further generates a frame header for a particular event frame by associating a respective frame sub-period identifier with the particular event frame.

17. The device of claim 13, wherein the tiler further generates a tile header for a particular tile by associating a respective tile identifier with the particular tile.

18. The device of claim 13, wherein the encoder generates a code sequence individually representing a respective brightness indicator value of a pixel corresponding to a respective pixel sensor in the first area, in response to a determination that a number of pixel events within a respective tile associated with the respective tile address breaches a threshold volume within a sub-period associated with the sub-period identifier.

19. The device of claim 13, wherein the encoder determines whether to use a first encoding process or a second encoding process based on a threshold volume of a particular tile.

20. A non-transitory computer readable storage medium has stored therein instructions, which, when executed by one or more processors of an image processing device with an event camera including a plurality of pixel sensors distributed across a first area, cause the image processing device to:
convert an event stream from a pixel sensor over a first time period into event frames by dividing the first time period into a plurality of sub-periods, and bin pixel events of the event stream based on the plurality of sub-periods and respective timestamps of the pixel events, wherein each of the plurality of sub-periods is associated with a corresponding frame sub-period identifier;
address the plurality of pixel sensors by sub-dividing the first area into tiles, wherein each of the tiles includes a respective grouping of the plurality of pixel sensors, wherein a tile address of a particular pixel sensor is a combination of a respective tile identifier and a position locator of the particular pixel sensor associated with the respective tile identifier; and
encode the pixel events as a function of a respective tile address, a frame sub-period identifier, and a brightness indicator value.

* * * * *